AUTOMATIC CONTROL DEVICE FOR ELECTRONIC FLASH

Original Filed April 18, 1968 11 Sheets-Sheet 1

INVENTORS
TOMOJI MURATA
SADAO YAMAOKA

BY Mullen & Siegel
Attys

AUTOMATIC CONTROL DEVICE FOR ELECTRONIC FLASH

Original Filed April 18, 1968 11 Sheets-Sheet 2

INVENTORS
TOMOJI MURATA
SADAO YAMAOKA
BY Mullen & Siegel
Attys

AUTOMATIC CONTROL DEVICE FOR ELECTRONIC FLASH

Original Filed April 18, 1968 11 Sheets-Sheet 3

INVENTORS
TOMOJI MURATA
SADAO YAMAOKA
BY Mullen & Siegel
Attys

AUTOMATIC CONTROL DEVICE FOR ELECTRONIC FLASH

Original Filed April 18, 1968 11 Sheets-Sheet 4

INVENTORS
TOMOJI MURATA
SADAO YAMAOKA

BY Mullen & Siegel
Attys

AUTOMATIC CONTROL DEVICE FOR ELECTRONIC FLASH

Original Filed April 18, 1968 11 Sheets-Sheet 5

INVENTORS
TOMOJI MURATA
SADAO YAMAOKA

BY Mullen & Siegel
Attys

AUTOMATIC CONTROL DEVICE FOR ELECTRONIC FLASH

Original Filed April 18, 1968 11 Sheets-Sheet 6

INVENTORS
TOMOJI MURATA
SADAO YAMAOKA
BY Mullen & Siegel
Attys

AUTOMATIC CONTROL DEVICE FOR ELECTRONIC FLASH

Original Filed April 18, 1968 11 Sheets-Sheet 7

INVENTORS
TOMOJI MURATA
SADAO YAMAOKA
BY Mullin & Siegel
Attys

AUTOMATIC CONTROL DEVICE FOR ELECTRONIC FLASH

Original Filed April 18, 1968 11 Sheets-Sheet 8

INVENTORS
TOMOJI MURATA
SADAO YAMAOKA

BY Mullen & Siegel
Atty's

AUTOMATIC CONTROL DEVICE FOR ELECTRONIC FLASH

Original Filed April 18, 1968 11 Sheets-Sheet 9

INVENTORS
TOMOJI MURATA
SADAO YAMAOKA
BY Mullen & Siegel
Attys

AUTOMATIC CONTROL DEVICE FOR ELECTRONIC FLASH

Original Filed April 18, 1968 11 Sheets-Sheet 10

INVENTORS
TOMOJI YAMAOKA
SADAO YAMAOKA
BY Mullen & Siegel
Attys

AUTOMATIC CONTROL DEVICE FOR ELECTRONIC FLASH

Original Filed April 18, 1968 11 Sheets-Sheet 11

INVENTORS
TOMOJI YAMAOKA
SADAO YAMAOKA
BY Mullen & Siegel
Attys

United States Patent Office

Re. 28,025
Reissued May 28, 1974

28,025
AUTOMATIC CONTROL DEVICE FOR ELECTRONIC FLASH

Tomoji Murata, 2306 Kanaoka-chou, Sakai, Osaka, Japan, and Sadao Yamaoka, 33-2 Nakanogawa-chou, Toyokawa, Aichi, Japan Original No. 3,591,829, dated July 6, 1971, Ser. No. 722,287, Apr. 18, 1968. Application for reissue Apr. 11, 1972, Ser. No. 243,095
Claims priority, application Japan, Apr. 20, 1967, 42/25,351; June 27, 1967, 42/41,126; Aug. 7, 1967, 42/50,649; Aug. 21, 1967, 42/53,637
Int. Cl. H01j *39/12;* H05b *41/36*
U.S. Cl. 315—151 19 Claims

Matter enclosed in heavy brackets [ ] appears in the original patent but forms no part of this reissue specification; matter printed in italics indicates the additions made by reissue.

ABSTRACT OF THE DISCLOSURE

A device for automatic control of the quantity of light from an electronic flash, by comparing the brightness of a photographic object with the quantity of light required for particular photographing conditions including the degree of lens aperture selected and the sensitivity of the film used. The brightness of the photographic object is measured as the sum of the natural light brightness and the brightness due to electronic flash, and as soon as the sum brightness thus measured reaches the required quantity of light, a stop signal is given. Thereby, the electronic flash is controlled, and at the same time signal is given for the sufficient brightness of the photographic object.

This invention relates to a device for automatic control of the quantity of light from electronic flash, responsive to the brightness of the respective photographic object in view of settings of the sensitivity of film, the degree of lens aperture, and shutter speed. More particularly, the present invention relates to an automatic controlling device for the quantity of light from electronic flash, which is capable of electronic flash photographing with or without the daylight by measuring both the natural or daylight component and the electronic flash component of the brightness of the photographic object.

With known automatic devices for controlling the quantity of light, it has been extremely difficult to carry out electronic flash photographing in the daylight, because only the light beams from electronic flash is measured by a photoelectric means, for determining the quantity of light, and hence, in measuring the brightness including the electronic flash light and natural light, there has been a considerably large error for the daylight brightness comparable with the electronic flash brightness.

Therefore, an object of the present invention is to obviate such difficulty of the known devices for controlling the quantity of light for photographing by providing an automatic device for controlling the quantity of light from electronic flash and for giving an alarm for the daylight sufficient for eliminating the need of electronic flash, which device, for instance, includes two photoelectric elements to measure the brightness of each photographic object in two separate quantities, i.e., one due to daylight and another due to electronic flash, respectively, so that the actual brightness of the object can be achieved by adding the above two quantities for regulating the quantity of light from the electronic flash, as well as for generating alarm signal in cases where the daylight is sufficient for successful photographing without necessitating the use of the electronic flash.

Another object of the present invention is to provide an automatic device for controlling the quantity of light from the electronic flash and for giving an alarm when the daylight is bright enough to eliminate the need of electronic flash. The device includes a photoelectric element for measuring the overall brightness of each photographic object owing to both the natural daylight and electronic flash; a discriminating means adapted to separate the DC component of the output from the photoelectric element, representative of the intensity of slowly changing daylight component of the object brightness, from the remaining AC component of said photoelectric element output, representative of the intensity of rapidly varying electronic flash component thereof; an integrator-amplifier adapted to integrate the thus discriminated AC component to produce an output representing quantity of light from the electronic flash and to amplify the DC component; an adder to add the thus integrated electronic flash component and the daylight component so as to produce a brightness output; a reference means for producing a reference output representing the sum of settings on film sensitivity, degree of lens aperture, etc.; a comparator to compare said brightness output with said reference output, so as to produce a control output; a control means to regulate the quantity of light from said electronic flash in response to said control output; and an alarm means for giving an alarm when said daylight quantity is too high to use said electronic flash.

A further object of the present invention is to provide a device for automatically controlling the quantity of light from electronic flash, which device includes a photoelectric element adapted to determine the overall brightness of each photographic object; an integrator adapted to integrate AC component of the output from said photoelectronic element, representing rapidly varying electronic flash component of said photoelectric element output, and to amplify DC component of said output, representing slowly varying daylight component thereof, so that said integrator produces an integrated output representing the sum of a quantity proportional to the electronic flash light quantity and another quantity proportional to the daylight quantity as modified by a selected shutter speed; a reference means for producing a reference output representing one or more settings on film sensitivity, degree of lens aperture, etc.; a comparator for comparing said integrated output and said reference output to produce a control output; and a control means for controlling the quantity of light from said electronic flash, responsive to said control output.

Another object of the present invention is to provide an automatic device for controlling the quantity of light from the electronic flash of any of the aforesaid types, which device includes a switch circuit consisting of SCR switch elements for regulating said quantity of light from electronic flash, having a starting unit and a bias unit for providing reverse bias to quicken the turnoff operation thereof. According to the present invention, the switch circuit is connected in series with the electronic flash, so that the duration of light emanating from the electronic flash can be controlled by regulating the switching time of said switch circuit. To insure satisfactory operation at high speed, the switch circuit should have a high interrupting capacity to deal with the high loss during such high speed switching operation. On the other hand, as well known to those skilled in the art, the instantaneous peak current in an SCR can be several ten times as large as the maximum mean forward current, and in the case of electronic flash circuit, the duration of current flowing through the SCR, if used, is very short with comparatively long nonconducting periods between succeeding operations. Accordingly, a small capacity SCR can be used in the electronic flash circuit. Since the small capacity SCR has difficulty in turning off a large current, in the device of the invention, a counterbias means is provided to shorten the switching time down to two-thirds—one-third of that without it.

Other objects and a fuller understanding of the present invention may be had by referring to the following description, taken in conjunction with the accompanying drawings, in which:

FIG. 5 is a schematic diagram of a circuit for setting the film sensitivity, the degree of lens aperture, and the like;

Like parts and elements are designated by like numerals and symbols throughout the drawings.

Figure 1:
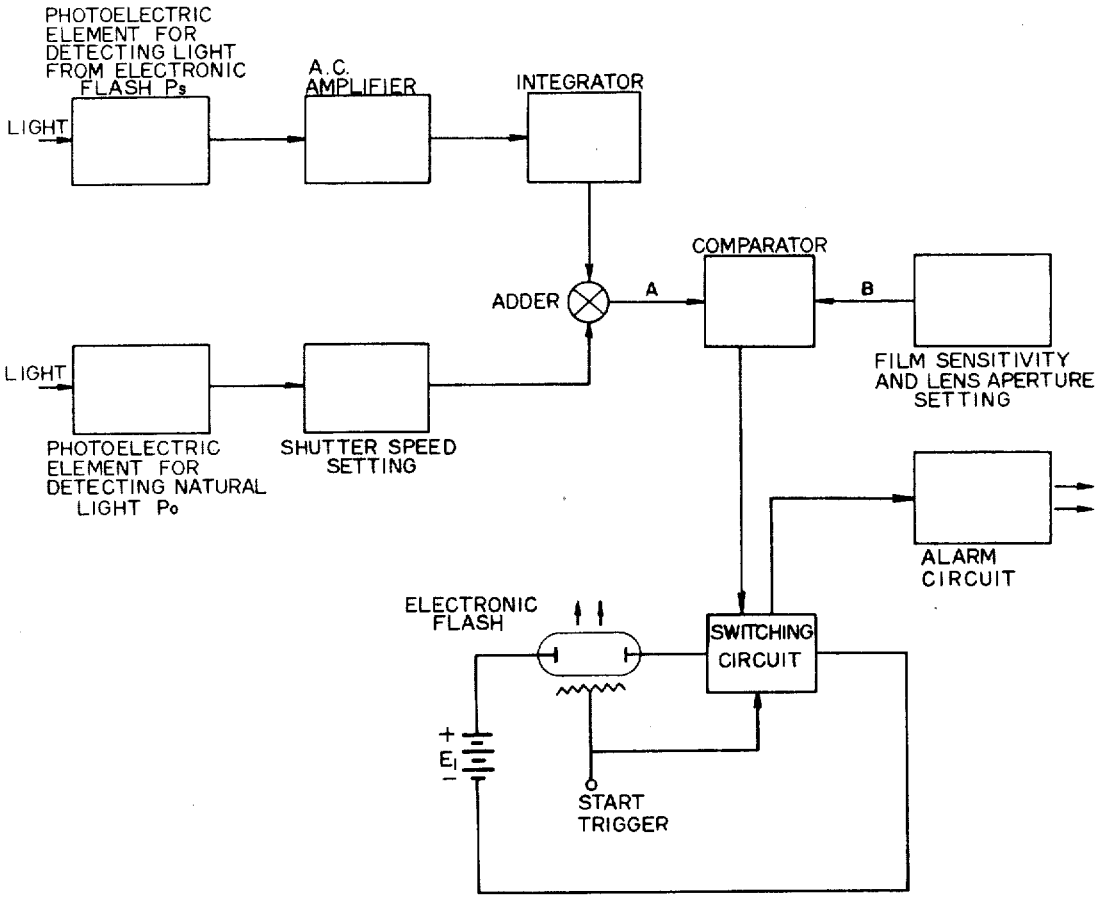
FIG. 1 is a block diagram of a control device embodying the present invention.

The quantity of light to be emanated from an electronic flash for successful photographing is determined in the following manner, in the control device according to the present invention. For the sake of simplicity, it is assumed in the following derivation of equations that separate photoelectronic elements are used for electronic flash light and for daylight or natural light. However, it is apparent to those skilled in the art that by using a suitable discriminator means, the quantity of light for both the electronic flash and natural light can be determined with only one photoelectric element.

If the overall brightness of the photographic object is assumed to have a value $B_o$ due to daylight or natural light and another value $B_s$ due to electronic flash light, then the quantity of light delivered to a photoelectric element $P_s$ for electronic flash is equal to $K_1(B_s+B_o)$, $K_1$ being a constant. Accordingly, the total output current from the photoelectric element $P_s$ is $$(i_s+i_o=K_2(B_s+B_o),$$

wherein $K_2$ is another constant, $i_s$ is a photoelectric current generated by light from the electronic flash, and $i_o$ is a photoelectric current generated by natural light. The photoelectric current $i_o$ generated by natural light can be considered as a direct current, because the natural light intensity varies only very slowly. Hence, by passing the output current from the photoelectric element $P_s$ through an AC amplifier, the DC component $i_o$ thereof can be eliminated, so as to produce an amplified AC component $K_3i_s$, $K_3$ being a constant. By integrating the thus separated AC component for the time period corresponding to each energization of the electronic flash, the following output can be achieved.

$$K_4 \int i_s dt \text{ ($K_4$ being a constant)}$$

On the other hand, another photoelectric element $P_o$ for natural light has the same output $(i_s+i_o)$ as that of the preceding element $P_s$. Upon bypassing the AC component, by means of a capacitor, the DC component, representing the brightness due to the natural light, can be separated and delivered as an output quantity $K_5i_o$ ($K_5$ being a constant).

It is apparent to those skilled in the art that by using a suitable combination of high-pass and low-pass filters, the aforesaid two photoelectric elements $P_s$ and $P_o$ can be replaced with only one photoelectric element P, to achieve the same output quantities $K_4 \int i_s dt$ and $K_5i_o$.

The proper quantity of light to be expressed to a film is generally given by the following equation.

$$(\int B_s dt+B_oT)/F^2=K/S$$

Here,

F represents the degree of lens aperture,
T the shutter speed selected,
S the sensitivity of the film used, and
K a constant.

Accordingly, the following relation should be satisfied for successful photographing.

$$(K_4\int i_s dt+K_5i_oT)/F^2=K/S$$

Rearranging, $$K_4\int i_s dt=KF^2/S-K_5i_oT$$

The last mentioned equation gives the quantity of light to be generated by an electronic flash for successful photographing.

Now, referring to FIG. 1, the AC component of the output from a photoelectric element $P_s$ for detecting light from an electronic flash is amplified by an AC amplifier for separating the DC component thereof and for amplifying the AC component. Then the AC component is integrated by an integrator to deliver an output quantity proportional only to the magnitude of the AC component. On the other hand, the AC component of the output from another photoelectric element $P_o$ for detecting natural light is bypassed by a suitable capacitor, so that the remaining DC component of the output from $P_o$ is delivered as another output quantity $B_oT$, incorporating the shutter speed setting. The two output quantities are added by an adder to produce a brightness output A, which is applied to a comparator.

Another input quantity to the comparator is an output B, which is equal to $KF^2/S$ and represents the settings of the degree of lens aperture and the film sensitivity, as defined above.

If the quantity of light from the electronic flash increases to raise the level of the brightness output A delivered to the comparator, until it coincides with the setting output B representing the film sensitivity and the degree of lens aperture, then the condition of $A=B$ is achieved and a stop signal is delivered to a switch circuit to turn it off. Thereby, proper quantity of light for the given setting can be achieved.

If there is a very strong natural light available, which is sufficient for successful photographing without energizing the electronic flash, for a given shutter speed T, then the condition of $A \geqq B$ is established, so that the comparator generates a stop signal before energization of the electronic alarm, to actuate the alarm circuit. Thereby, the alarm is given to notify that the electronic flash need not be energized.

Figure 2:
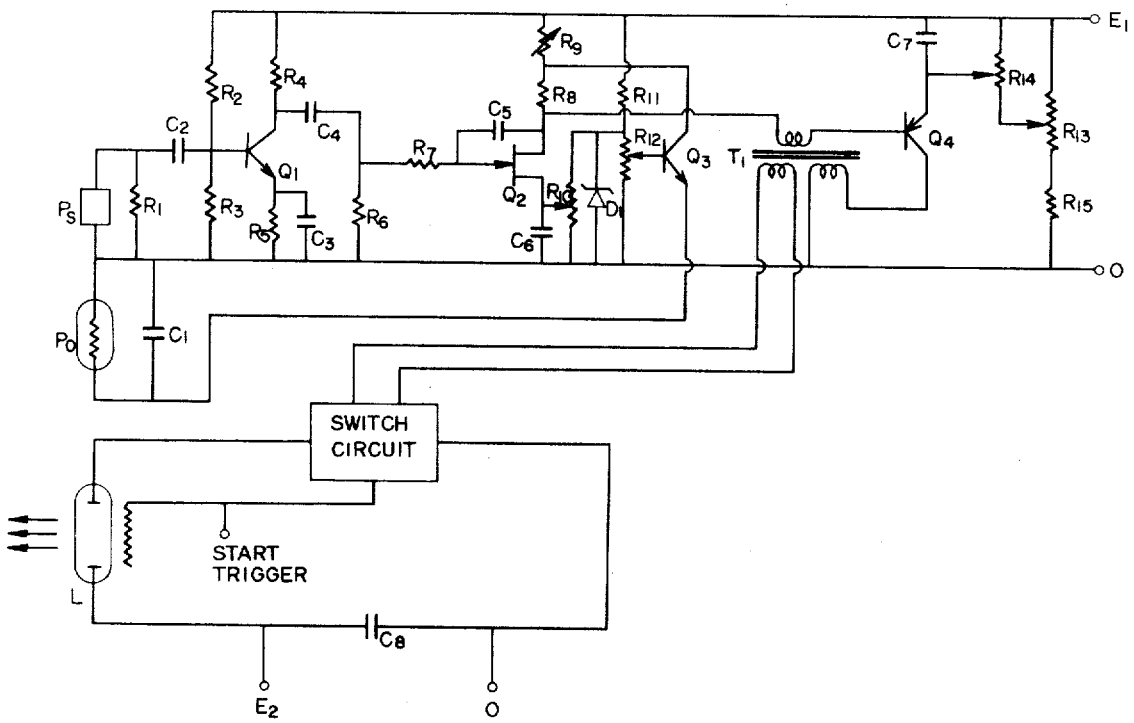
FIG. 2 is a circuit diagram of the control device.

In FIG. 2, the output from the photoelectric element P, for detecting light from the electronic flash is connected to an AC amplifier, which consists of a transistor $Q_1$, resistors $R_2$, $R_3$, $R_4$, $R_5$, capacitors $C_2$, and $C_3$. The output from the AC amplifier is applied to an integrator comprising a field effect transistor $Q_2$, resistors $R_6$, $R_7$, $R_8$, $R_{10}$, capacitors $C_5$, and $C_6$. An electric quantity, representative of the quantity of natural light, can be produced by a circuit including a photoelectric element $P_o$, a transistor $Q_3$, resistors $R_9$, $R_{11}$, $R_{12}$, and a capacitor $C_1$. A Zener diode $D_1$ is connected to the base of the transistor $Q_3$ to maintain the base voltage at a constant level $E_o$. The shutter speed setting is represented by regulating the resistance value of the resistor $R_9$, which is a rheostat type. By connecting, in series, the resistor $R_8$ of the integrator associated with the electronic flash to the resistor $R_9$ associated with the natural light, the brightness output A can be produced.

Figure 4:
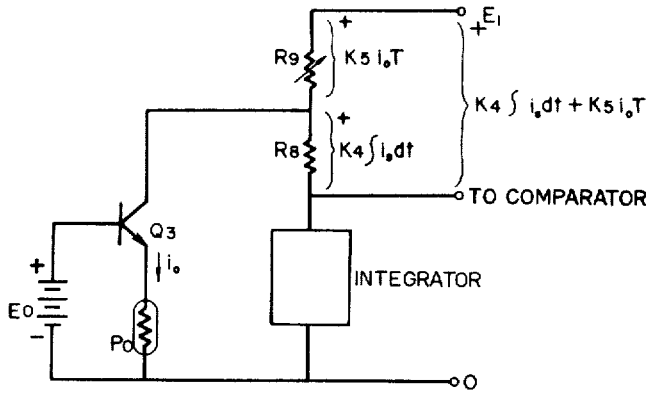
FIG. 4 is a simplified circuit diagram of a means for measuring the quantity of light of daylight or natural light brightness.

FIG. 4 shows the details of the natural light detecting circuit of an adder circuit, in which a constant standard voltage $E_o$ is applied across the base of the transistor $Q_3$ having the photoelectric element $P_o$ connected to the emitter thereof. Then, the differential voltage between the base and the emitter of the transistor is small, and a substantially constant voltage $E_o$ is applied across the photoelectric element $P_o$, regardless of the resistance variation of the element $P_o$. If the photoelectric element $P_o$ has the performance characteristics $K''/B_o=R$, wherein $K''$ is a constant, $B_o$ is the brightness at the element, and R is the internal resistance of the element, then the emitter current $i_o$ can be given by $i_o=E_o/R=E_oB_o/K''$. In this case, the collector current $i_o'$ is approximately the same as the emitter current $i_o$ namely $i_o'\approx i_o$. If the resistance value of the variable resistor $R_9$ is so adjusted as to represent the shutter speed T according to the relation of $$R_9=K_5T,$$

then the voltage across the resistor $R_9$ represents the quantity of light due to natural light, which is given by $$K_5i_o'T=K_5i_oT=K'B_oT. \text{ (K' being a constant)}$$

If the resistance value of $R_8$ is selected to be very large, as compared with $R_9$, or $R_9$ $R_8$, then only $R_8$ acts as the effective load resistor of the integrator and $R_9$ becomes negligible as the load resistor. Thus, the voltage across the resistor $R_8$ is given by $\overline{K}_4\int i_s dt$, which represents the quantity of light of the electronic flash. Accordingly, the brightness output terminals across the resistors $R_8$ and $R_9$ receive a voltage given by $$K_4\int i_s dt+K_5i_oT.$$

Figure 5:
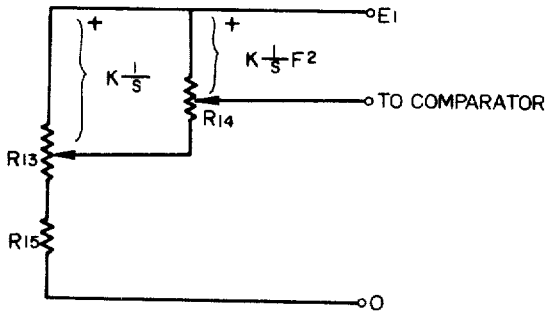

Referring back to FIG. 2, a comparator is connected to the brightness output terminals through a blocking transformer $T_1$, which comparator comprises a transistor $Q_4$, a capacitor $C_7$, and variable resistors $R_{13}$, $R_{14}$ for setting the film sensitivity and the degree of lens aperture. In FIG. 5, if the resistor $R_{14}$ is assumed to be not acting as a load of the resistor $R_{13}$, then the output voltage across the slider of the resistor $R_{14}$ is determined by the position of each slider of the resistors $R_{13}$ and $R_{14}$. By adjusting the sliders of the linearly variable resistors $R_{13}$ and $R_{14}$, it is possible to produce a setting output $KR^2/S$ at the output terminal, which is the slider of the resistor $R_{14}$.

In FIG. 2, a capacitor $C_7$ is charged with the setting output voltage, and the voltage across the capacitor $C_7$ is continuously compared with the brightness output voltage, appearing across the resistors $R_8$ and $R_9$ connected in series, which varies according to the formula $$(K_4\int i_s dt+K_5i_oT).$$

When the brightness output voltage across the resistors $R_8$ and $R_9$ becomes the same as the setting voltage across the capacitor $C_8$, the transistor $Q_4$ of the comparator is blocked, so that a stop signal pulse is generated at the output winding of the transformer $T_1$, which is then delivered to a switch circuit.

Figure 3:
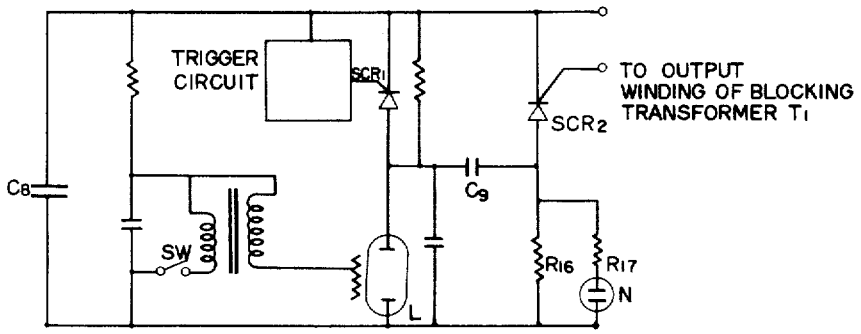
FIG. 3 is a circuit diagram of a switch circuit with an alarm means, usable in the control device.

FIG. 3 shows the construction of the switch circuit for clamping the electronic flash L. When a start switch SW of the electronic flash is closed, the electronic flash L is actuated, and at the same time, a trigger circuit actuates the trigger $SCR_1$ to bring it into conductive state. Upon application of the stop signal pulse from the transformer $T_1$ to an $SCR_2$ of the switch circuit, the $SCR_2$ becomes conductive to bypass the current of the electronic flash L through a capacitor $C_9$. Thus, the $SCR_1$ becomes nonconductive, and when the capacitor $C_9$ is charged in the reverse direction, the electronic flash L is turned off. Thus, the desired quantity of light is obtained from the electronic flash L.

There is provided an alarm neon tube N across a resistor $R_{16}$ through another resistor $R_{17}$. If the quantity of natural light is sufficient for photographing, or if the brightness output exceeds the setting output representing the film sensitivity S and the degree F of the lens aperture, without actuating the electronic flash L, the comparator generates the stop signal pulse continuously, to make the $SCR_2$ conductive. The resistance value of the resistors $R_{16}$ and $R_{17}$ is selected to be high enough not to maintain the $SCR_2$ conductive when the stop signal pulse is removed. Thus, the $SCR_2$ becomes conductive only when the stop signal pulse is applied thereto. In other words, the voltage is intermittently applied across the resistor $R_{17}$ to flash the neon tube N. As a result, the flashing of the neon tube N gives an alarm informing that the electronic flash L need not be actuated.

As described in the foregoing, according to the present invention, the natural light component and the electronic flash light component of the brightness of the photographic object are measured separately, so that accurate exposure control can be insured. On the other hand, known exposure control systems for electronic flash photographing measure only the electronic flash component of the brightness even in daylight. Moreover, when the daylight is sufficient for particular photographing conditions, the alarm signal is given to indicate that the electronic flash need not be actuated, so that proper application of the electronic flash is insured.

Figure 6:
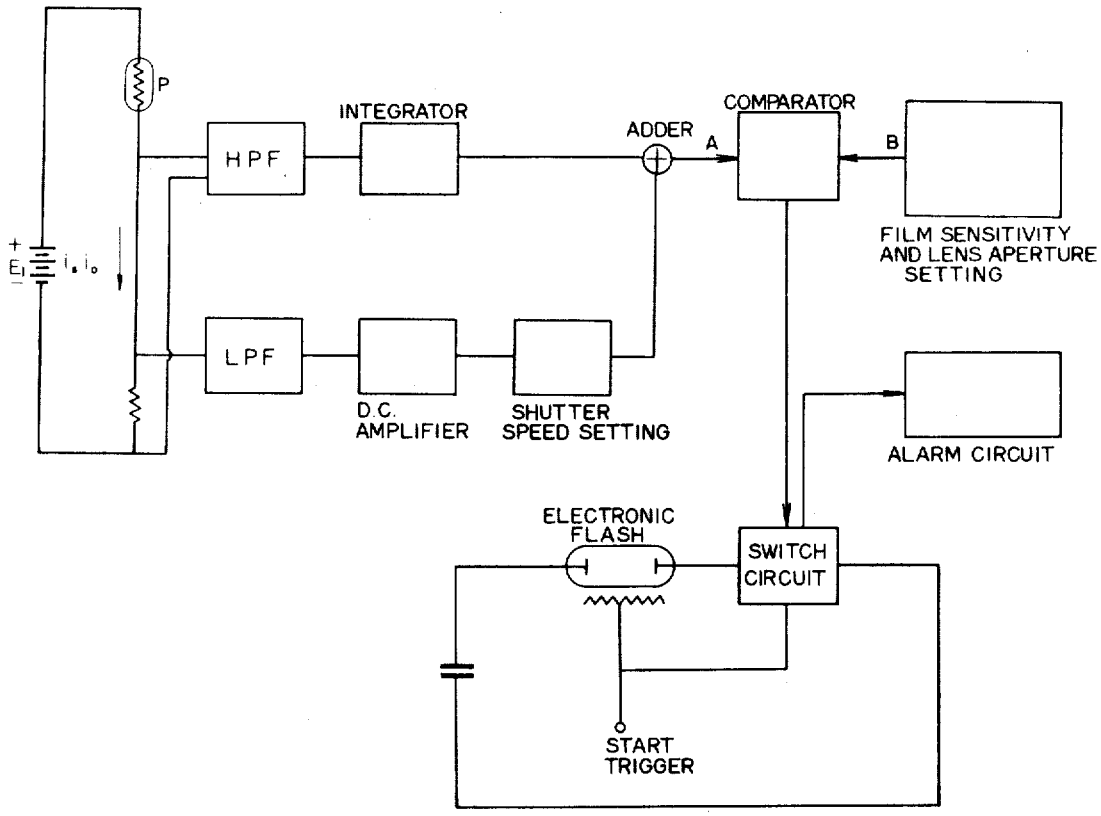
FIG. 6 is a block diagram similar to FIG. 1 but showing another control device according to the present invention.

Referring to FIG. 6, illustrating the block diagram of another embodiment of the present invention, a portion of the output from a photoelectric element P is applied to a high-pass filter HPF and then integrated by an integrator, to produce an integrator output, which is proportionate only to the quantity of light from an electronic flash. The remaining portion of the output from the photoelectric element P is applied to a low-pass filter LPF and then amplified by a DC amplifier, to produce an amplifier output through a means for setting shutter speed. The output from the shutter speed setting means represents a quantity $B_oT$ which is proportionate only to the quantity of natural light. An adder is provided to take the sum A of the integrator output and the shutter speed setting means output, so as to apply the thus achieved sum to a comparator. The sum A corresponds to the brightness output of the preceding embodiment, described in detail hereinbefore referring to FIGS. 1 to 5.

A setting output B, which represents a quantity $KF^2/S$, indicative of the film sensitivity and the degree of lens aperture is applied to the comparator, so that the setting output B may be compared with the brightness output A, in the same manner as in the preceding embodiment.

Figure 7:
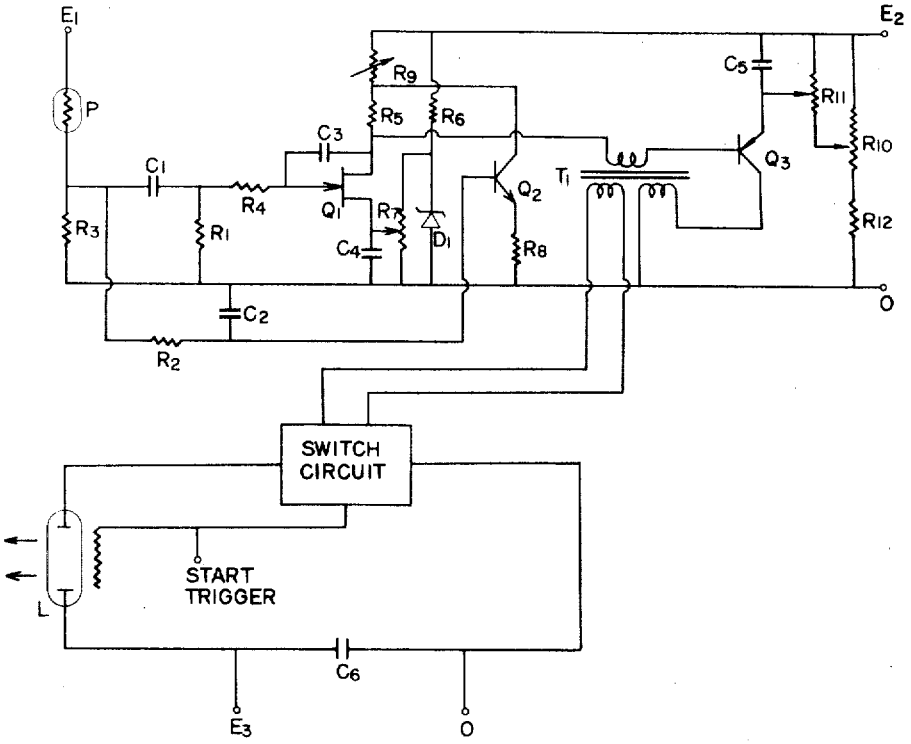
FIG. 7 is a circuit diagram of the control device of FIG. 6.

In FIG. 7 showing the circuitry of the device of FIG. 6, the output from the photoelectric element P is taken as the voltage across a resistor $R_3$ connected in series to the element P. A high-pass filter HPF consists of a capacitor $C_1$ and a resistor $R_1$. An integrator is formed by a field effect transistor $Q_1$, resistors $R_4$, $R_5$, $R_6$, $R_7$ and capacitors $C_3$, $C_4$. A Zener diode $D_1$ is used to maintain the bias voltage of the field transistor $Q_1$ at a constant level. A resistor $R_2$ and a capacitor $C_2$ constitute the low-pass filter LPF, while a transistor $Q_2$ and resistors $R_8$, $R_9$ form the detector of natural light. The resistor $R_9$ is of rheostat type and acts as a means for setting the shutter speed indication, and the series connection of the resistors $R_5$ and $R_9$ contributes to produce the sum of the electronic flash light component and the natural light component of the photographic object brightness, i.e. a brightness output A.

To determine the natural light component of the brightness the resistor $R_8$ connected in series to the transistor $Q_2$ has a high resistance value, so that it does not act as the load of the low pass filter. Then, the voltage across the resistor $R_8$ is approximately the same as the output voltage from the low-pass filter. If the resistance value R of the photoelectric element P has the characteristics of $Ra1/B_o$, wherein $B_o$ is the brightness at the photographic element, the emitter voltage $E_e$ is given by the following equation.

$$E_e = E_1R_3/(R+R_3) = E_1R_3/R.$$

Here, $E_1$ represents the voltage applied to the photoelectric element, and $R_3$ represents the resistance value of the resistor $R_3$, which is negligibly small, as compared with R, i.e. $R_3 << R$.

In this case, the collector current is about the same as the emitter current, and hence, the collector current $i_o'$ can be given by the following equation.

$$i_o' = i_o = (R_3E_1/R)/R_8 = K_6/R$$
$$K_6 = R_3E_1/R_8$$

If the shutter speed T is so selected as to establish $R_9 = K_5T$, wherein $R_9$ is the resistance value of the variable resistor connected in series to the transistor $Q_2$, then the voltage across the resistor $R_9$ is given by $$Ki_o' = K_5i_oT = K'B_oT \text{ (K' being a constant).}$$

The above voltage across $R_9$ represents the quantity of natural light.

If the resistance value of $R_5$ is selected to be for larger than $R_9$, so as to establish the relation of $R_9 << R_5$, then the resistor $R_5$ acts as the load resistor of the integrator, while $R_9$ becomes negligible as the load of the integrator. Thus, the voltage across $R_5$ becomes $K_4\int i_8dt$ representing the quantity of light from the electronic flash. Accordingly, the output voltage across the resistors $R_9$ and $R_5$ connected in series becomes $(K_4\int i_5dt + K_5i_oT)$, which is the brightness output.

In FIG. 7, a comparator comprises a transistor $Q_3$, a capacitor $C_5$, and a blocking transformer $T_1$. The film sensitivity and the degree of lens aperture are set by regulating the sliders on the resistors $R_{10}$ and $R_{11}$, respectively.

Figure 8:
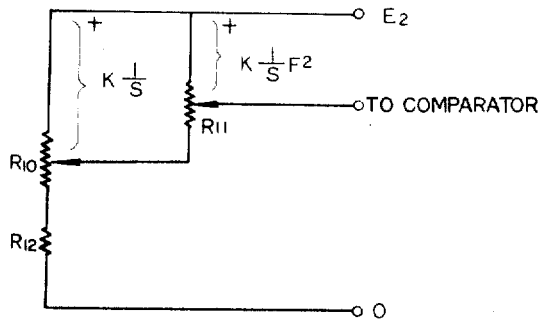
FIGS. 8 and 9 are diagrams similar to FIGS. 5 and 3 respectively but showing a setting circuit and a switch circuit usable in the device of FIG. 6.

The circuitry for setting the film sensitivity and the lens aperture degree is shown in FIG. 8. If the resistor $R_{11}$ is assumed not to act as a load of the resistor $R_{10}$, the output from the resistor $R_{11}$ is determined by the position of sliders of each resistor. If the sliders of the linearly variable resistors $R_{10}$ and $R_{11}$ are so set as to represent K/S and $F^2$, respectively, then the output from the resistor $R_{11}$ represents the function $KF^2/S$, or the setting output, as in the case of the preceding embodiment.

A capacitor $C_5$ is provided to store the setting output $KF^2/S$ from the resistor $R_{11}$ as a voltage across the capacitor. The brightness output $(K_4\int i_5dt + K_5i_oT)$, appearing across the resistors $R_5$ and $R_9$ connected in series, is compared with the aforesaid setting output $KF^2KS$, stored in the capacitor $C_5$, so that if the two outputs coincide, the comparator is blocked and produces a stop signal pulse at the secondary differential winding of the transformer $T_1$. The stop signal pulse actuates the switch circuit.

Figure 9:
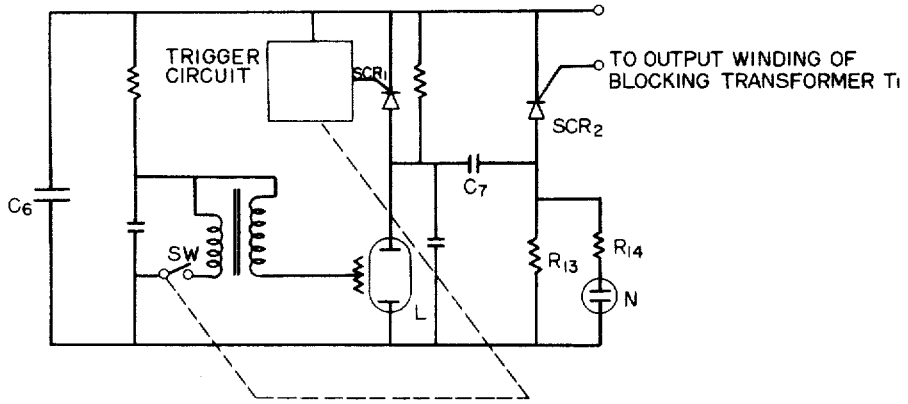

In FIG. 9, when an electronic flash starting switch SW is closed, the electronic flash L is energized, and at the same time, the trigger circuit is actuated to make a silicon controlled rectifier $SCR_1$ conductive. If the stop pulse signal from the comparator, indicating the coincidence of the setting and brightness outputs, is delivered to another silicon controlled rectifier $SCR_2$; and the current in the electronic flash L is shifted to a path through a capacitor $C_7$ and $SCR_2$, and hence the $SCR_1$ is blocked. Accordingly, as the capacitor $C_7$ is charged in the opposite polarity, the electronic flash L is deenergized. Thus, the quantity of light from the electronic flash is controlled, by stopping it at any desired moment.

A neon tube N is connected across a resistor $R_{13}$ through another resistor $R_{14}$, for alarm purpose. When the brightness output reaches the same level as the setting output without energizing the electronic flash, or when the natural light is sufficient for the desired photographing without actuating the electronic flash, the stop signal pulse is continuously delivered from the comparator to the $SCR_2$. In this case, due to the high resistance value of the resistors $R_{13}$ and $R_{14}$, the $SCR_2$ cannot remain conductive after the stop signal pulse is removed. In other words, the $SCR_2$ is conductive only when the stop signal pulse is applied thereto. Thus, an intermittent voltage is applied across the resistor $R_{14}$ to ignite the neon tube N. As a result, the flashing of the neon tube N indicates that the electronic flash need not be energized.

As described in the foregoing, according to the present invention, both the natural light component and flash light component of the brightness of the photographic object can be detected by a single photoelectric element, and then the output from the photoelectric element is divided into the flash component and natural light component the latter component, incorporating the shutter speed setting, so that the exposure to the electronic flash can be controlled more accurately than by any known automatic methods of measuring only the flash light quantity. Moreover, when the natural light is sufficient for satisfactory photographing under certain photographing conditions, an alarm is given to indicate that the electronic flash need not be energized. Thus, successful flash photographing is insured with and without daylight.

Figure 10:
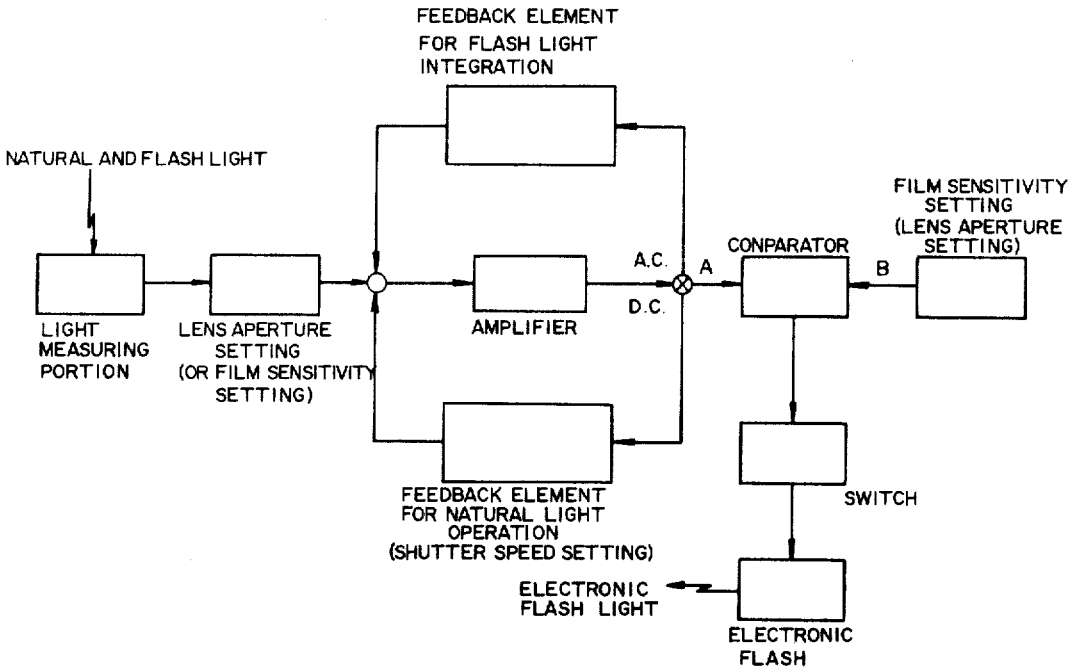
FIG. 10 is a block diagram of another embodiment of the present invention.

FIG. 10 shows a block diagram of another embodiment of the present invention, in which an integrator capable of both integration and simple amplification is used. A photoelectric element in the light measuring portion receives light from the photographic object, including the natural light and flash light components. The output current from the photoelectric element is modified by the setting of the sensitivity of the film used or lens aperture degree selected, and then applied to an integrator at the amplifier portion thereof. The AC component of the output from the amplifier is fed back to its input side through a feedback element for integration of the flash light component, while the DC component of said output is fed back to the input side of the amplifier through another feedback element for natural light. Thus, at the output side of the amplifier, an output representing the quantity of flash light is provided. At the same time, another output representing the quantity of natural light, as modified by the aforesaid setting is also delivered to the output side of the amplifier. The two output quantities are added to form a brightness output A, representing both the natural light and the flash light components of the object brightness, which is then applied to a comparator. A setting output B, representing the film sensitivity or the degree of lens aperture, is also applied to the comparator, so as to be made reference to the brightness output A. When the quantity of light from the object is increased by the electronic flash, until the brightness output A coincides with the setting output B, a stop signal pulse is generated at the comparator, which is then dispatched to a switch circuit, to turn it off. Thus, the quantity of light from the electronic flash is controlled at a desired level. In the illustrated embodiment, the degree of lens aperture or the sensitivity of film used is incorporated in the light measuring portion on one side of the comparator. However, it is also possible to incorporate both the lens aperture setting and the film sensitivity setting in the setting output B to be applied to the comparator from the opposite end thereof.

Figure 11:
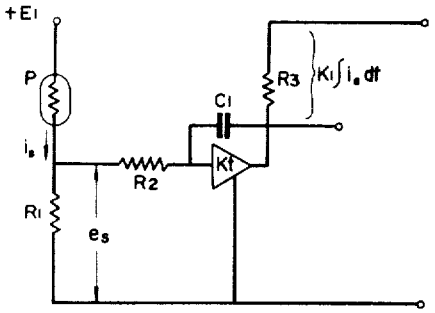
FIG. 11 is a circuit diagram of a computing means for electronic flash light.

FIG. 11 illusrates a circuit for integrating the electronic flash light. The voltage $e_s$ across a resistor $R_1$, produced by an electric current $i_s$ from the photoelectric element P and representing the quantity of the electronic flash light, is given by $$e_s = i_s R_1.$$

A capacitor $C_1$ and a resistor $R_2$ constitute an integrator for integrating the quantity of the electronic flash light, which delivers the integrated value as a voltage $E_A$ across a resistor $R_3$.

$$E_A = -(1/C_1R_2)\int e_s dt = -(R_1/C_1R_2)\int i_s dt = K_1\int i_s dt$$

$$(\text{here, } K_1 = -(R_1/C_1R_2)).$$

Figure 12:
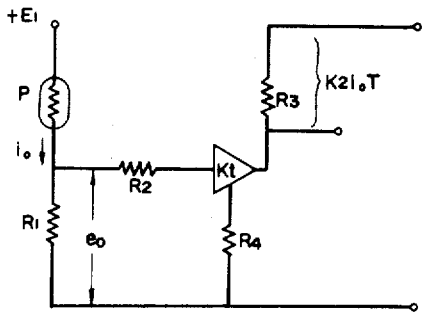
FIG. 12 is a circuit diagram of another computing means for daylight or natural light.

FIG. 12 shows a circuit for computing natural light quantity, in which the voltage $e_o$ across a resistor $R_1$, produced by an electric current $i_o$ from the photoelectric element and representing the natural light quantity, is given by $$e_o = i_o R_1.$$

It is fed back through another resistor for natural light feedback. Accordingly, the DC output voltage $E_D$ is given as follows.

$$E_D = K_1 e_o/(1-\beta K_1) = K_1 i_o R_1/(1-\beta K_1) = i_o R_2/(1/K_1-\beta).$$

Here, $K_1$: voltage gain, without feedback
$\beta$: feedback ratio, $\beta = R_4/R_3$.

Assuming that $1/K_1$ is negligible as compared with $\beta$, i.e. $\beta >> 1/K_6$, the DC output can be given by $$E_D = -i_o R_1/\beta = -i_o R_3 R_1/R_4 = i_o K_2/R_4.$$

Here, $K_2 = -R_3R_1$.

Thus, the amplification factor of this circuit becomes $K_2/R_4$. By setting the quantity $1/R_4$ as the shutter speed setting value T, one obtains $$E_D = K_2 i_o T.$$

Figure 13:
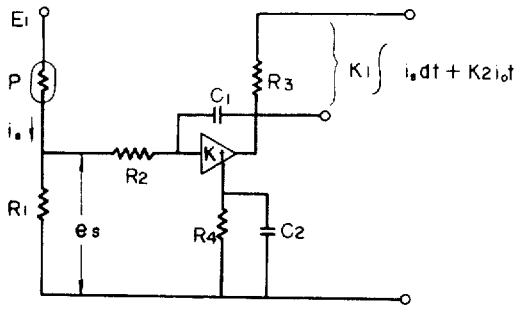
FIG. 13 is a circuit diagram of an integrator of quantity of light, actually used in the device of FIG. 10.

FIG. 13 shows a circuit to be used for integrating and amplifying the quantity of light, from each photographic object, in which the circuits of FIGS. 11 and 12 are incorporated. A capacitor $C_2$ is connected in parallel with the resistor $R_4$ is for bypassing the AC component to the ground, so as to prevent the AC component from being fed back. Thus, only the DC component is fed back for synthesis. The voltage $E_2$ across the resistor $R_3$ represents the sum of the DC output $E_D$ and AC output $E_A$, which sum can be given by $$E_2 = E_A + E_D = K_1\int i_s dt + K_2 i_o T \quad (1)$$

On the other hand, the proper quantity of light at the film surface is given by $$(1/F^2)(\int B_s dt + B_o T) = K/S$$

wherein,

B, represents the brightness of the photographic object, due to the electronic flash,
$B_o$ the brightness of the same, due to natural light,
F the degree of lens aperture,
T the shutter speed,
S the film sensitivity, and
K a constant.

By rearranging, $$\int B_s dt + B_o T = KF^2/S \quad (2)$$

If $K_2$ and $K_2$ are so chosen as to satisfy the relations of $B_s = K_1 i_s$ and $B_o = K_2 i_o$, then the equation (1) can be equated with the equation (2).

Thus, the output voltage $E_2$ can be given by $$E_2 = K_1\int i_s dt + K_2 i_o T = KF^2/S \quad (3)$$

By rearranging, $$K_1\int i_s dt = KF^2/S - K_2 i_o T$$

The last mentioned equation represents the quantity of light to be emanated by the electronic flash.

By rearranging the equation (3), $$S(K_1\int i_s dt + K_2 i_o T) = KF^2 \quad (4)$$

$$(K_1\int i_s dt + K_2 i_o T)/F^2 = K/S \quad (5)$$

Figure 14:
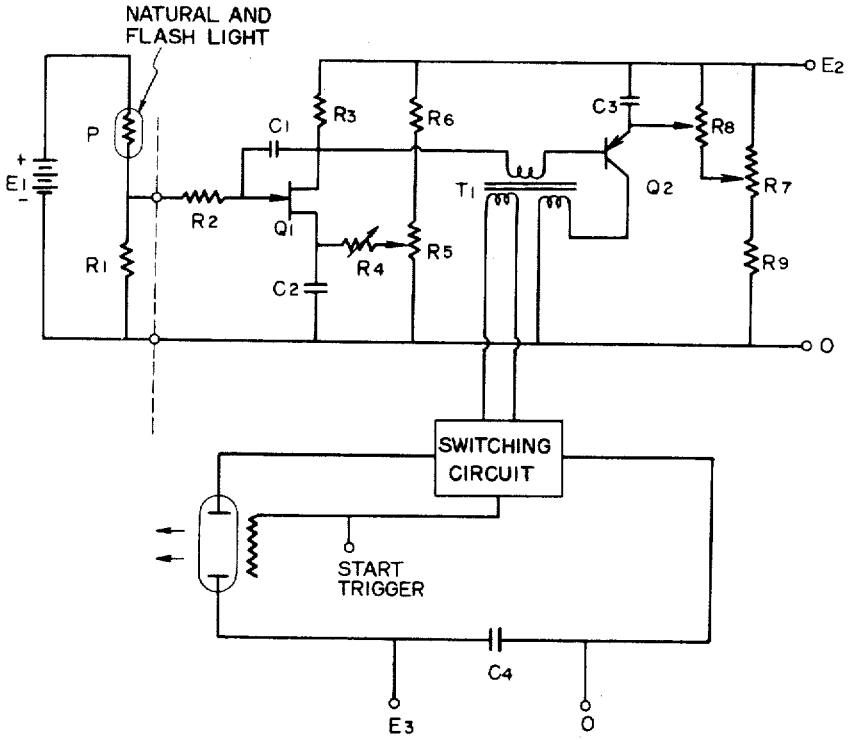
FIGS. 14 and 15 are circuit diagrams of the device of FIG. 10.
Figure 15:
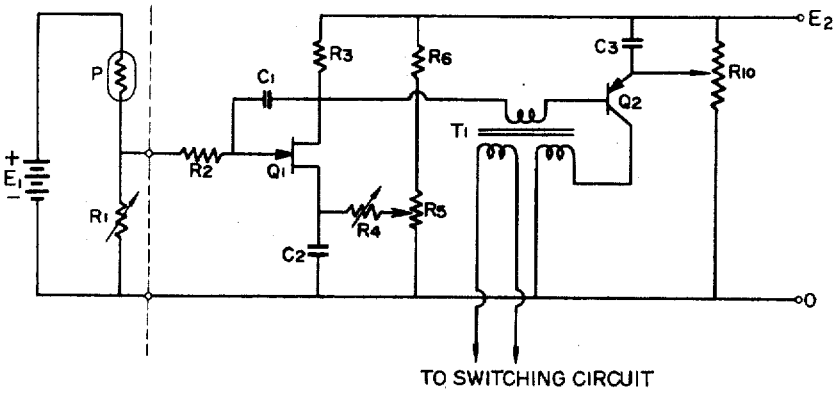

FIGS. 14 and 15 show circuitry embodying the present invention. In FIG. 14, a load resistor $R_1$ is connected in series with the photoelectric element P to deliver an output voltage proportional to the magnitude of the output current from the photoelectric element. A field transistor $Q_1$, resistors $R_2$, $R_3$, $R_4$, $R_5$, and capacitors $C_1$, $C_2$ constitute an integrator for the quantity of light. Resistors $R_5$ and $R_6$ act to provide the bias voltage to the field transistor $Q_1$, under the conditions that the current flowing through the resistors $R_5$ and $R_6$ is sufficiently large, as compared with the current through the field transistor $Q_1$. A capacitor $C_2$ serves to bypass the AC component of the output current from the photoelectric element, so that the AC component is not fed back. By properly selecting the values of resistors $R_1$, $R_2$ and the capacitor $C_1$, an integral $K_1\int i_s dt$ can be achieved, which represents the quantity of light from the electronic flash. The variable resistor $R_4$ serves for setting the shutter speed, and the output voltage $K_2 i_0 T$ can represent the quantity of natural light if the values of resistors $R_1$, $R_3$ and $R_4$ are properly selected. As a result, the voltage across the resistor $R_3$ gives the following sum.

$$K_1\int i_s dt + K_2 i_0 T$$

A comparator in this embodiment comprises a transistor $Q_2$, a capacitor $C_2$ and a blocking transformer $T_1$, while the variable resistors $R_7$ and $R_8$ are for setting the film sensitivity and the degree of lens aperture, respectively. If the resistors $R_7$ and $R_8$ are so selected as to represent the linear functions K/S and $F^2$ by properly positioning the sliders, respectively, then the output voltage from the resistor $R_8$ can represent a function $KF^2/S$ corresponding to the thus selected positions of the sliders of the two variable resistors. A capacitor $C_3$ is provided for storing the output voltage $KF^2/S$, generated at the variable resistor $R_8$.

When the output voltage at the resistor $R_3$, which is given by $(K_1\int i_s dt + K_2 i_0 T)$ increases and coincides with the voltage across the capacitor $C_3$, which is $KF^2/S$, then the comparator is blocked. Then, the output winding of the blocking transformer $T_1$ generates a stop signal pulse, which is delivered to a switch circuit to turn it off. Thus, the electronic flash is deenergized, so as to attain a desired quantity of light therefrom.

In the circuit of FIG. 15, the resistance of a resistor $R_1$ in series with the photoelectric element P is made variable in order to represent either the film sensitivity S or the lens aperture degree F. In other words, either one of S and F of the right hand side term $KF^2/S$ of the equation (3), which is given as the voltage across the capacitor $C_3$ in the circuit of FIG. 14, is now shifted, so that the capacitor $C_3$ of FIG. 15 will store the right-hand side term of the equations (4) or (5), i.e. $KF^2$ or K/S.

Table 1 shows the manner in which the shutter speed T, film sensitivity S and the lens aperture degree F are set according to the equations (3), (4), and (5), respectively in the embodiment.

TABLE 1

| Setting method (equation) | $R_1$ | $R_4$ | Output voltage of $R_3$ | $R_7$ | $R_8$ | $R_{10}$ | Voltage across $C_3$ |
|---|---|---|---|---|---|---|---|
| I (3) | Fixed | $\frac{1}{T}$ | $K_1\int i_s dt+K_2 i_o T$ | $\frac{K}{S}$ | $F^2$ | ---------- | $KF^2/S$ |
| II (3) | do | $\frac{1}{T}$ | $K_1\int i_s dt+K_2 i_o T$ | $F^2$ | $\frac{K}{S}$ | ---------- | $KF^2/S$ |
| III (4) | S | $\frac{1}{T}$ | $S(K_1\int i_s dt+K_2 i_o T)$ | ---------- | | $KF^2$ | $KF^2$ |
| IV (5) | $\frac{1}{F^2}$ | $\frac{1}{T}$ | $\frac{1}{F^2}(K_1\int i_s dt+K_2 i_o T)$ | ---------- | | $\frac{K}{S}$ | $\frac{K}{S}$ |

Figure 16:
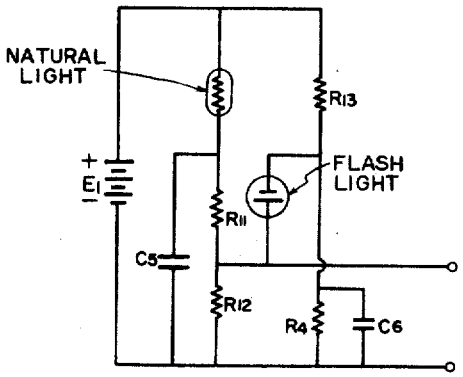
FIG. 16 is a circuit diagram of a different light measuring means, usable in the control device according to the present invention.

FIG. 16 illustrates another circuit usable for measuring the light, which has a pair of separate elements for detecting the natural light and the electronic flash light, respectively. This detecting circuit can be replaced with that portion of the circuit of FIG. 14 or 15, which is to the left of the chain line thereof. An element having a P-N junction with the photoelectric effect, such as a photocell, a solar battery cell, or a phototransistor, can be used for each or either one of the detecting elements, so as to prevent interference between the two detecting elements by using a reverse bias by taking advantage of the rectifying charactristics of such P-N junction elements. At the same time, it is made easier to achieve linear relations between the output current and the natural light or electronic flash light.

As described in the foregoing, according to the present invention, a light quantity integrating circuit is provided, which is adapted to integrate the AC component of the light quantity, i.e. the electronic flash light component thereof, and to merely amplify the D.C. component, i.e. the natural light component. Moreover, the amplification factor of the integrator can be varied regardless of the integrating function thereof for the AC component. With such characteristics of the integrator, it is made possible to vary the shutter speed in accordance with the amplification factor, so that the natural light quantity can be easily measured. The fact that the output of the integrator is the sum of the quantities of the natural light and the electronic flash light is particularly advantageous for the control purposes. In this integrator, the setting of the film sensitivity and the degree of lens aperture can be carried out by adjusting the output from the light detecting elements. Furthermore, the sensitivity of the light detecting elements can be easily adjusted, because the integrating and amplifying functions of the integrator are independent with each other, even when the sensitivities of separate light detecting elements for the natural and electronic flash light are modified separately.

Figure 17:
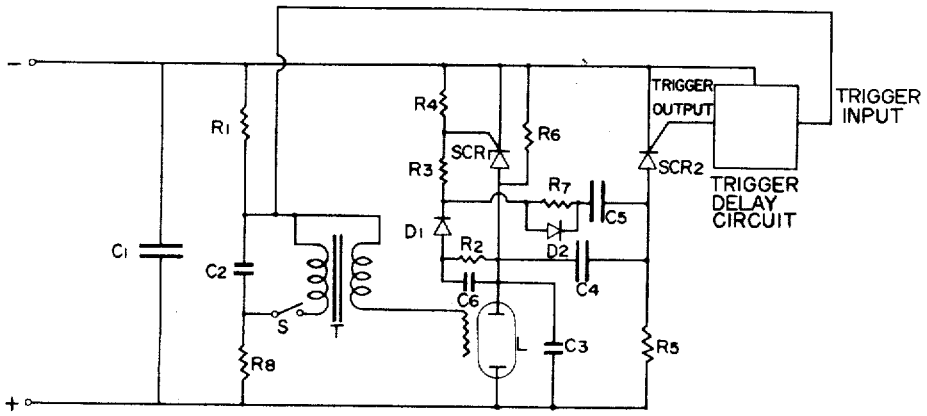
FIG. 17 is a circuit diagram of switching means usable in any of the aforesaid control devices.
Figure 18:
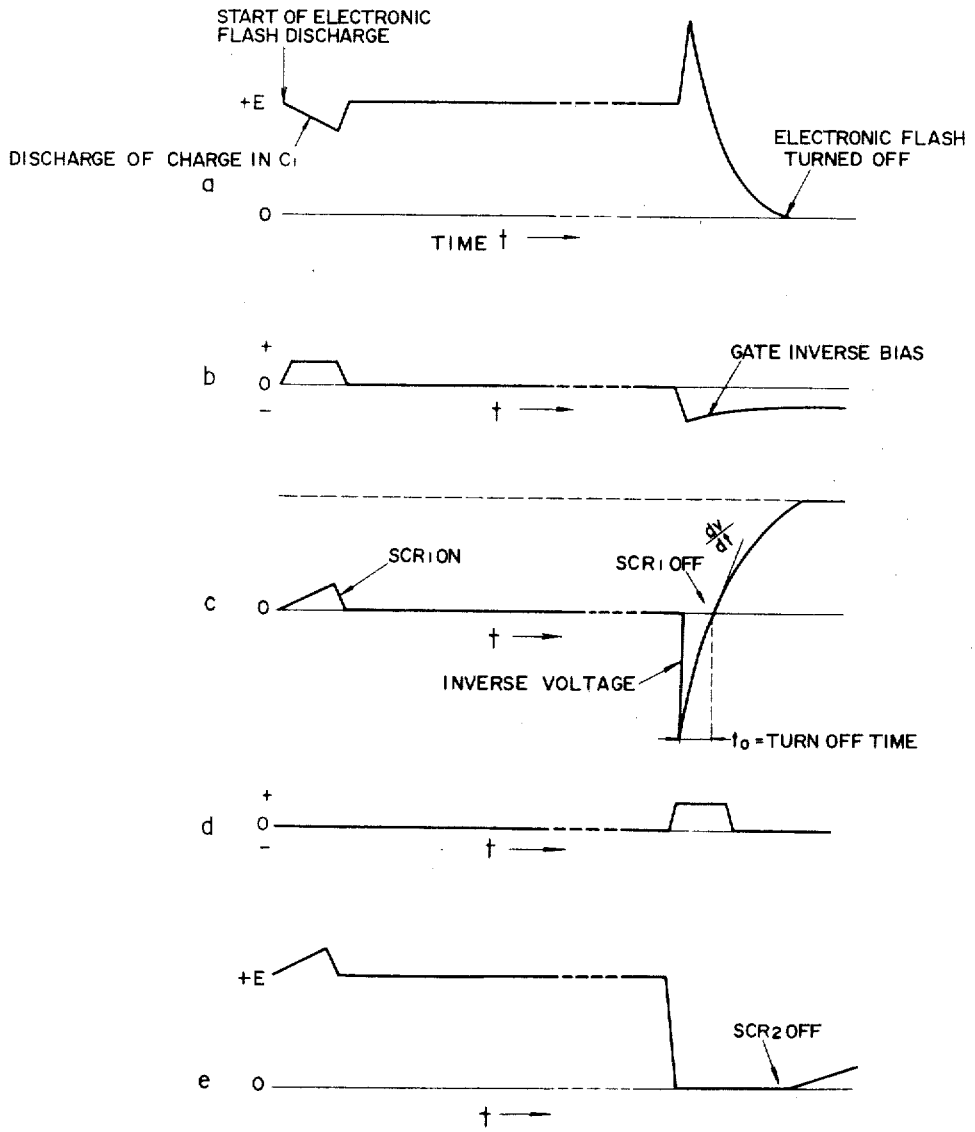
FIG. 18 is a graph showing curves representing operation of various circuit elements in the device according to the present invention.

FIG. 17 shows a switch circuit usable in the control device according to the present invention and FIG. 18 shows the operating characteristics of such a switch circuit. The turnoff section of the switch circuit includes a pair of silicon controlled rectifiers $SCR_1$ and $SCR_2$. The $SCR_2$ facilitates the commutation of the $SCR_1$. When a switch SW is closed to actuate a high voltage trigger transformer T, a high voltage pulse is delivered to an actuating electrode of the electronic flash L, so as to start the electronic flash L by discharging a capacitor $C_3$ connected in parallel with the electronic flash L. When the voltage across the capacitor $C_3$ drops as it discharges, an electric current flows through a circuit including a capacitor $C_6$, a diode $D_1$, and a resistor $R_3$ and reaches the gate of the SCR as a positive gate current. Thus, the $SCR_1$ is made conductive. Hence, the electronic flash L is maintained as energized. Such starting operation is illustrated in FIG. 18.

The turn-off-operation of the switch circuit will now be described. Before the $SCR_1$ is turned off, a capacitor $C_4$ is charged through resistors $R_5$ and $R_6$ in the polarity as shown in FIG. 17. Another capacitor $C_5$ is also charged through resistors $R_5$, $R_7$, $R_3$, $R_4$. A trigger delay circuit is actuated as soon as the switch S is closed, to generate a delayed pulse. When this delayed pulse is applied to the gate of the $SCR_2$, to make it conductive, the capacitor $C_4$ is discharged, so that a reverse current flows through the $SCR_1$ to turn it off. At the same time, with the $SCR_2$ made conductive, the charge in the capacitor $C_5$ is discharged through resistors $R_4$, $R_2$, and the diode $D_1$, to apply a reverse bias to the $SCR_1$. The timing of the application of such reverse bias is determined by the capacity of the discharge circuit of capacitor $C_5$ and the time constant of the resistors therein, and the reverse bias is applied to the $SCR_1$ even after the application of starting voltage is initiated. Thus, the du/dt characteristics are improved and the turnoff time is shortened. Accordingly, the conductive period of the $SCR_2$, which is necessary to turn off the $SCR_1$, can be also shortened, and hence, the current carrying capacity of $SCR_2$ can be small.

Behaviors of various currents and voltages during this turnoff operation are depicted in the curves of FIG. 18. When the commutation capacitor $C_4$ is charged to the power source voltage E, the current through the $SCR_2$ is interrupted, and the $SCR_2$ itself is blocked. A resistor $R_2$ is provided to facilitate the discharge of the capacitor $C_6$, while the resistor $R_7$ is to recharge the capacitor $C_5$ in the polarity as shown in FIG. 17, after the electronic flash L is turned off.

As described in the foregoing, according to the present invention, there is provided a switch circuit to be closed upon firing of the electronic flash, which has a simpler circuit construction than that of any known switching circuit including a trigger circuit to be triggered to make the switch circuit conductive. With the shortened turnoff time, the silicon controlled rectifiers to be used in this switch circuit can be of a very inexpensive type, and hence the switching circuit can be made at low cost.

Although the present invention has been described with a certain degree of particularity, it is understood that the present disclosure has been made only by way of example and that numerous changes or modifications in the details of construction and the combination and arrangement of parts may be resorted to without departing from the spirit and the scope of the invention as hereinafter claimed.

We claim:

1. An automatic control circuit for determining the duration of light emitted by an electronic flash unit, said control circuit comprising photoelectric means positioned to receive light reflected from an object illuminated by natural light and by flash light from the electronic flash unit, electric filter means coupled to said photoelectric means and operative to furnish at a first output thereof a first component representative of the reflected natural light and at a second output thereof a second component representative of the reflected flash light, integrating circuit means coupled to the second output of said electric filter means for integrating said second component, an adding circuit coupled to said integrating circuit means and to the first output of said electric filter means and operative to produce an output voltage proportional to the sum of said first component and the integration of said second component, circuit means to provide a reference voltage proportional to the exposure as established by the sensitivity of the film in the associated camera and the size of the lens aperture, a comparator coupled to said adding circuit and to said circuit means and operative to produce a control signal when the difference between said output voltage and said reference voltage reaches a predetermined value, and a firing circuit coupled to said comparator and to the electronic flash unit for terminating the flash produced thereby upon reception of said control signal.

2. The automatic control circuit set forth in claim 1, wherein said photoelectric means includes a first photoelectric element and a second photoelectric element, and said electric filter means includes first and second filter portions respectively coupled to said first and second photoelectric elements, said first filter portion being operative to pass only said first component and said second filter portion being operative to pass only said second component.

3. The automatic control circuit set forth in claim 1, wherein said photoelectric means consists of a single photoelectric element.

4. The automatic control circuit set forth in claim 1, wherein said firing circuit includes a capacitor coupled in parallel with said electronic flash unit and operative to fire said electronic flash unit by discharging therethrough, a starting section having a silicon controlled rectifier coupled to said capacitor and being conductive in response to the discharge of said capacitor to close a switchable circuit through the electronic flash unit, a reverse bias section for applying a reverse bias to said silicon controlled rectifier upon reapplication with a predetermined time delay determined by a capacity and a resistance, and a pair of diodes preventing mutual interference between said starting section and said reverse bias section.

5. The automatic control circuit set forth in claim 1, and further comprising an indicating means coupled to said comparator and being operative to provide an alerting signal when said output voltage exceeds said reference voltage.

*6. An automatically controlled flash illuminating network comprising means including a photosensitive element for producing a control signal in response to a predetermined amount of light incident on said photosensitive element, a storage capacitor, a first semiconductor switching device including a control electrode and two main current carrying electrodes, a flash tube coupled in series with said first semiconductor switching device, said series circuit comprising said first semiconductor switching device and said flash tube being connected in parallel to said storage capacitor, means for firing said flash tube and applying a closing trigger signal to the control electrode of said first semiconductor switching device, a commutation capacitor, means for charging said commutation capacitor, a second semiconductor switching device including a control electrode and two main current carrying electrodes, said device being actuatable to a closed condition in response to said control signal and coupled in series with said commutation capacitor across the main electrodes of said first semiconductor switching device whereby to apply a reverse voltage between said first semiconductor switching device main electrodes to open said first semiconductor switching device in response to the said closing of the said second semiconductor switching device.*

*7. The network of claim 6 including means for applying a reverse bias to the control electrode of said first semiconductor switching device in response to the closing of said second semiconductor switching device.*

*8. The network of claim 7 wherein said means for applying a reverse bias comprises a reverse biasing capacitor and impedance means series coupled between a main electrode of said second semiconductor switching device and the control electrode of said first semiconductor switching device.*

*9. The network of claim 8 wherein said impedance means comprises resistor means.*

*10. The network of claim 6 wherein said means for applying a closing trigger signal to said first semiconductor switching device includes impedance means connected with said flash tube and a control electrode of said first semiconductor switching device for causing a closing trigger signal to be applied to said control electrode of said first semiconductor switching device in response to the firing of said flash tube.*

*11. The network of claim 10 wherein said impedance means comprises an impedance element and a capacitor element connected in series across said storage capacitor, said capacitor element being connected across said flash tube.*

*12. The network of claim 11 wherein said impedance comprises at least one resistor.*

*13. An automatically controlled flash illuminating network comprising a storage capacitor, a first semiconductor switching device including a control electrode and two main current carrying electrodes, an electronic flash tube connected in series with said first semiconductor switching device, said series circuit comprising said first semiconductor switching device and said flash tube being connected in parallel to said storage capacitor, means including a photosensitive element for producing a control signal in response to a predetermined amount of light incident on said photosensitive element, a second semiconductor switching device including a control electrode and two main current carrying electrodes actuatable to a closed condition in response to said control signal, means including a commutation capacitor interconnecting corresponding main electrodes of said first and second semiconductor switching devices, means connecting said commutation capacitor across said storage capacitor whereby the closing of said second semiconductor switching device applies the voltage of said commutation capacitor as a reverse voltage across said first semiconductor switching device, means responsive to the closing of said second semiconductor switching device for applying a reverse bias to the control electrode of said first semiconductor switching device and including a capacitor coupled between the control electrode of said first semiconductor switching device and a main electrode of said second semiconductor switching device, means for applying a closing trigger signal to the control electrode of said first semiconductor switching device, including a capacitor shunting said flash tube and coupled to the control electrode of said first semiconductor switching device, and diode means coupled with said first semiconductor switching device trigger means and said means for applying a reverse bias.*

*14. The network of claim 13 wherein each of said semiconductor switching devices is a silicon controlled rectifier.*

*15. An automatically controlled flash illuminating network comprising means including a photosensitive element for producing a control signal in response to a predetermined amount of light incident on said photosensitive element, a storage capacitor, a first switching device including a control electrode and two main current carrying electrodes, a flash tube coupled in series with said first switching device, said series circuit comprising said first switching device and said flash tube being connected in parallel to said storage capacitor, means for firing said flash tube and applying a closing trigger signal to the control electrode of said first switching device, a commutation capacitor, means for charging said commutation capacitor, a second semiconductor switching device including a control electrode and two main current carrying electrodes, said device being actuatable to a closed condition in response to said control signal and coupled in series with said commutation capacitor across the main electrodes of said first switching device whereby to apply a reverse voltage between said first switching device main electrodes to open said first switching device in response to the said closing of the said second switching device.*

*16. An automatically controlled flash illuminating network comprising a D.C. voltage source, a switching device, an electronic flash tube for producing light energy of extremely short duration, said flash tube being coupled in*

*series with said switching device across said voltage source, means for firing said flash tube and closing said switching device, sensing means including photosensitive means for producing an electrical signal which is a function of the total value of the light incident on said photosensitive means, means including a commutation capacitor connected to be charged by said network, and means responsive to said sensing means at a predetermined value of said electrical signal and operable with said commutation capacitor to apply a reverse voltage to said switching device for opening said switching device in response to a predetermined amount of light incident in said photosensitive means to extinguish said flash tube thereby terminating light energy from said flash tube.*

*17. A network as defined in claim 16 wherein the last-named means includes a second switching device actuatable to a closed condition when said electrical signal is at a predetermined value and coupled in series with said commutation capacitor and said first switching device whereby to apply a reverse voltage across said first switching device to open said first switching device in response to the said closing of said second switching device.*

*18. A network as defined in claim 17 wherein said D.C. voltage source includes main storage capacitor means*

*for discharging through said flash tube and said first-named switching device.*

*19. A network as defined in claim 17 wherein said first switching device includes two main electrodes, and said second switching device and said commutation capacitor are connected in series across the main electrodes of said first switching device.*

References Cited

The following references, cited by the Examiner, are of record in the patented file of this patent or the original patent.

UNITED STATES PATENTS

| | | | |
|---|---|---|---|
| 3,392,284 | 7/1968 | Cain | 323—22 SC |
| 3,350,604 | 10/1967 | Erickson | 315—151 |
| 3,464,332 | 9/1969 | Davison et al. | 95—10 |

HERMAN KARL SAALBACH, Primary Examiner

L. J. DAHL, Assistant Examiner

U.S. Cl. X.R.

95—10 R; 250—214; 315—159, 241 P